US010937094B1

(12) United States Patent
Creamer (10) Patent No.: US 10,937,094 B1
(45) Date of Patent: Mar. 2, 2021

(54) ORDER INHERITANCE, SUCH AS FOR USE IN FINANCIAL TRADING

(71) Applicant: Geneva Technologies, LLC, Chicago, IL (US)

(72) Inventor: Robert S. Creamer, Chicago, IL (US)

(73) Assignee: Geneva Technologies, LLC, Chicago, IL (US)

(*) Notice: Subject to any disclaimer, the term of this patent is extended or adjusted under 35 U.S.C. 154(b) by 1112 days.

(21) Appl. No.: 15/052,779

(22) Filed: Feb. 24, 2016

Related U.S. Application Data

(60) Provisional application No. 62/120,284, filed on Feb. 24, 2015.

(51) Int. Cl.
*G06Q 40/04* (2012.01)

(52) U.S. Cl.
CPC .................................. *G06Q 40/04* (2013.01)

(58) Field of Classification Search
CPC ............................... G06Q 40/04; G06Q 40/06
See application file for complete search history.

(56) References Cited

U.S. PATENT DOCUMENTS

| | | | | |
|---|---|---|---|---|
| 7,231,363 B1* | 6/2007 | Hughes | .............. | G06Q 30/0601 705/26.1 |
| 7,657,474 B1* | 2/2010 | Dybala | .................. | G06Q 10/06 705/35 |
| 7,747,493 B1* | 6/2010 | Monroe | ................. | G06Q 30/00 705/35 |
| 7,769,652 B1* | 8/2010 | Monroe | ................. | G06Q 30/00 705/35 |
| 7,797,239 B2* | 9/2010 | Smith | ..................... | G06Q 20/10 705/44 |
| 7,809,628 B1* | 10/2010 | West | ...................... | G06Q 40/04 705/37 |
| 8,090,641 B1* | 1/2012 | Monroe | ................. | G06Q 40/04 705/37 |
| 8,249,976 B1* | 8/2012 | Prybell, Jr. | ............ | G06Q 40/04 705/37 |
| 2002/0087382 A1* | 7/2002 | Tiburcio | .......... | G06Q 10/06311 705/7.13 |
| 2002/0095376 A1* | 7/2002 | Likourezos | ............ | G06Q 20/04 705/40 |
| 2003/0172024 A1* | 9/2003 | Kokis | ..................... | G06Q 40/04 705/37 |
| 2004/0236662 A1* | 11/2004 | Korhammer | .......... | G06Q 40/04 705/37 |
| 2006/0136318 A1* | 6/2006 | Rafieyan | ................ | G06Q 30/06 705/37 |
| 2006/0293996 A1* | 12/2006 | Lutnick | .................. | G06Q 40/04 705/37 |

(Continued)

*Primary Examiner* — Mike Anderson
(74) *Attorney, Agent, or Firm* — Perkins Coie LLP (57) ABSTRACT

Systems and methods for order inheritance and order transfer are provided. In one embodiment, a user submits an order through trading platform. The order is then added to an order queue for execution on financial market. Once a trader has achieved a queue position, various embodiments allow the trader to indicate that the order is available for inheritance or transfer. Various display indicators may be used to notify other traders that the order and queue position are available. A new owner can be selected and the order ownership can be transferred. Other features are disclosed herein.

22 Claims, 7 Drawing Sheets

(56) References Cited

U.S. PATENT DOCUMENTS

| | | | |
|---|---|---|---|
| 2007/0027795 A1* | 2/2007 | Claus | G06Q 40/04 705/37 |
| 2008/0097893 A1* | 4/2008 | Walsky | G06Q 30/0601 705/37 |
| 2011/0010287 A1* | 1/2011 | Mittal | G06Q 40/04 705/37 |
| 2012/0016786 A1* | 1/2012 | Mintz | G06Q 40/04 705/37 |
| 2013/0110741 A1* | 5/2013 | Duzoglou | G06Q 40/04 705/36 R |
| 2015/0081508 A1* | 3/2015 | Schwall | G06Q 40/04 705/37 |
| 2017/0236202 A1* | 8/2017 | Melton | G06Q 40/04 705/37 |

* cited by examiner

ORDER INHERITANCE, SUCH AS FOR USE IN FINANCIAL TRADING

CROSS-REFERENCE TO RELATED APPLICATIONS

This application claims priority to U.S. Provisional Application Ser. No. 62/120,284 filed Feb. 24, 2015, which is incorporated herein by reference in its entirety for all purposes.

BACKGROUND

A financial market allows traders and entities to buy and sell (i.e., trade) financial securities (e.g., stocks and bonds), commodities (e.g., precious metals or agricultural goods), futures contracts, and other investment products. Financial markets work by placing interested buyers and sellers in one "place" (e.g., an actual or electronic marketplace), thus making it easier for market participants to find each other. A trader is a market participant who buys and sells financial instruments such as stocks, bonds, commodities, options, currencies, and derivatives.

Traders generally follow different timelines for transacting within a financial marketplace. Position/trend traders may stay in positions for over a few weeks, sometimes up to a year. Swing traders may hold positions for a few days to a few weeks. Day traders may hold positions throughout a trading day (for periods that are sometimes as short as a few seconds or as long as a few hours) and finish the day with no open positions. This form of trading requires the trader to be present in front of the computer when trading is occurring and to quickly review potentially profitable transactions based on the market data.

BRIEF DESCRIPTION OF THE DRAWINGS

Embodiments of the present invention will be described and explained through the use of the accompanying drawings in which.

In the drawings, some components and/or operations may be separated into different blocks or combined into a single block for the purposes of discussion of some of the embodiments of the present invention. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Various embodiments of the present technology generally relate to financial trading. More specifically, some embodiments relate to systems and methods that allow for a trading firm or an exchange to hand off orders to other traders. Many markets operate on a first-in first-out ("FIFO") basis as a way to determine which participant gets filled first at a given price. For example, a trader who enters a bid for 50 contracts at a price of 90 at 10:00 a.m. will have priority over another user who places a bid for 50 at a price of 90 at 10:01 a.m. If a seller elects to sell 75 contracts at 90, then the first user will be completely filled (assuming they were the first overall to enter an order) and the second user will only get 25 contracts of their order for 50 (and will now be first in queue for any other transactions at that price). As other users enter bids (or offers) at a price, priority queue position can become extremely important. For example, if a user is filled at a price first, the user has the knowledge and ability to interact with other markets for hedging, speculating, or risk management purposes. Additionally, the user may be the only participant filled at that price, likely achieving an optimal execution.

There may be times when a trader within a firm may decide that he or she no longer desires that bid or offer at that specific price, or may have to leave their desk and cannot leave a resting order in the market without being physically present. This can be a problem with traditional systems, as there is currently no ability for that trader to hand off their order to another trader who could benefit from the position in the queue. In some cases, depending on a given market's or exchange's rules, individuals who trade as a team may be able to control, and therefore trade, another trader's orders if they are on the same team. However, these situations are limited severely by exchange rules and are generally not allowed across different accounts or entities. In contrast, various embodiments provide for systems and methods with the capability of an order inheritance or an order exchange that may not be allowed to cross different accounts and/or entities. As a result, a trader could make their order available for assumption by another trader.

For example, in first-in first-out (FIFO) markets, a trader who has achieved an excellent queue position for a buy or sell order may decide to cancel that order. Some embodiments allow other traders (e.g., within a firm) to request that order. If the first trader cancels the order, the order then goes live in the requesting traders' order book. In some embodiments, an exchange can allow users to bid on the ability to use (i.e., inherit) an order in case that order is cancelled by its initial user. Some embodiments provide various display mechanisms to assist in order request/assignment process.

In accordance with various embodiments, a trader within a proprietary trading firm could place an electronic tag on his soon-to-be-abandoned order, which would then highlight that order to other traders within the firm. Various methodologies could be used to determine how other traders could elect to use that order; first to click on the order, priority given to senior traders, priority given to those with a risk need to hedge, highest payer, etc. Some embodiments allow traders to bid on orders within a certain period of time, including prior to the notification that the order is available. This bidding could consist of a payment per contract with or without execution, fixed payments, profit shares, etc. Regardless of the methodology, the decision process would be determined systematically and various display mechanisms can be used to notify users that an order is available.

In accordance with various embodiments, the marketplace or exchange itself could allow any user to bid on the ability to use an order in the event that order is cancelled by the current "owner." This mechanism would provide benefits to the exchange and its users, in that a given user may not have to invest in prohibitively expensive co-location or high-speed telecom lines in order to always have queue position. Instead, such users (typically lower frequency users) could selectively pay for queue position on demand. The various methodologies for allocating a given order would be similar to the trading firm example mentioned above.

In the following description, for the purposes of explanation, numerous specific details are set forth in order to provide a thorough understanding of embodiments of the present invention. It will be apparent, however, to one skilled in the art that embodiments of the present invention may be practiced without some of these specific details. While, for convenience, embodiments of the present technology are described with reference to financial instruments and exchanges, embodiments of the present technology are equally applicable to various other electronic queue-based technologies where individuals may be willing to pay for a place in the queue. For example, the techniques could be extended to the electronic selling of sporting tickets where season ticket holders might have a queue priority for additional venue or sporting tickets such as playoff games. As another example, high-end luxury automobiles that have limited editions often establish a purchasing priority based on a number of factors (e.g., purchase and/or ownership history). As such, the inheritance platform may be product agnostic and have a variety of product queues which can be maintained by the inheritance platform via a common protocol.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical discs, compact disc read-only memories (CD-ROMs), magneto-optical discs, ROMs, random access memories (RAMs), erasable programmable read-only memories (EPROMs), electrically erasable programmable read-only memories (EEPROMs), application-specific integrated circuits (ASICs), magnetic or optical cards, flash memory, or other types of media/machine-readable medium suitable for storing electronic instructions.

The following applications are hereby incorporated by reference in their entirety for all purposes: U.S. patent application Ser. No. 13/463,753 entitled "METHODS AND SYSTEMS FOR SHOWING PERSPECTIVE IN MARKET DATA" filed on May 3, 2012, U.S. patent application Ser. No. 13/837,945 entitled "METHODS AND SYSTEM FOR SHOWING PERSPECTIVE IN MARKET DATA" filed on Mar. 15, 2013, and U.S. Patent Application No. 61/909,969 entitled "PROVIDING GUARANTEED EXECUTION OF MARKET SPREADS" filed on Nov. 27, 2013.

Terminology

Brief definitions of terms, abbreviations, and phrases used throughout this application are given below.

The phrases "in some embodiments," "according to some embodiments," "in the embodiments shown," "in other embodiments," and the like generally mean the particular feature, structure, or characteristic following the phrase is included in at least one implementation of the present invention, and may be included in more than one implementation. In addition, such phrases do not necessarily refer to the same embodiments or different embodiments.

The term "module" or "engine" refers broadly to general or specific-purpose hardware, software, or firmware (or any combination thereof) components. Modules and engines are typically functional components that can generate useful data or other output using specified input(s). A module or engine may or may not be self-contained. Depending upon implementation-specific or other considerations, the modules or engines may be centralized or functionally distributed. An application program (also called an "application") may include one or more modules and/or engines, or a module and/or engine can include one or more application programs.

GENERAL DESCRIPTION

Figure 1:
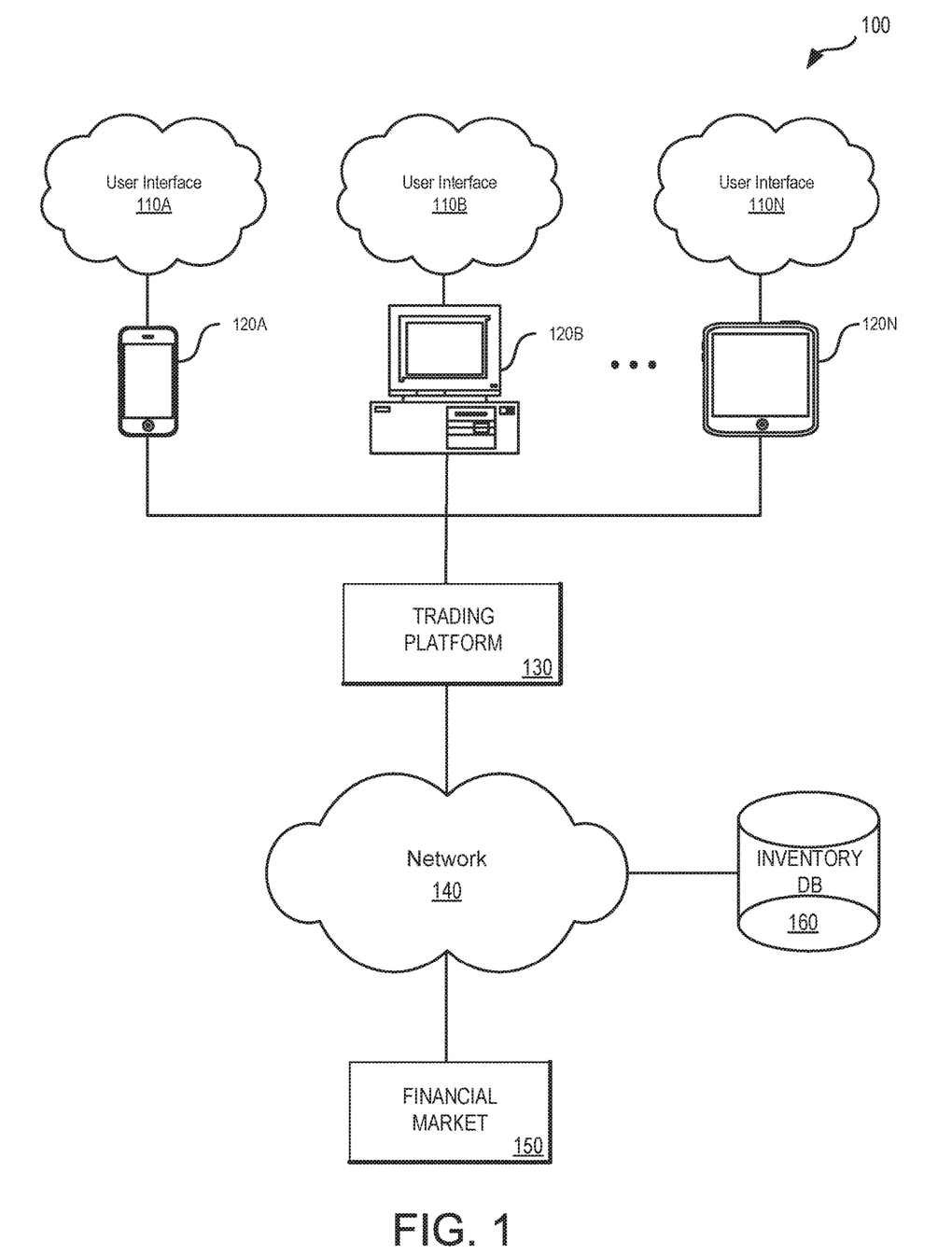
FIG. 1 illustrates an example of a network-based environment in which some embodiments of the present invention may be utilized.

FIG. 1 illustrates an example of a network-based environment 100 in which some embodiments of the present invention may be utilized. The embodiments illustrated in FIG. 1 show user interfaces 110A-110N running on computing devices 120A-120N. Computing devices 120A-120N can be any computing device capable of receiving user input as well as transmitting and/or receiving data via trading platform 130. Trading platform 130 can connect via network 140 to electronic marketplace or financial market 150 and inventory database 160. While only one trading platform 130, network 140, electronic marketplace 150, and inventory database 160 are illustrated in FIG. 1, other embodiments may include multiple trading platforms 130, networks 140, electronic marketplaces 150, and/or inventory databases 160.

In one embodiment, computing device 120A-120N may be a conventional computer system (e.g., a desktop or laptop computer), a tablet computer, or a mobile device having computer functionality (e.g., a mobile telephone or a smartphone). Computing devices 120A-120N may be configured to communicate with trading platform 130. In some embodiments, computing devices 120A-120N can retrieve or submit information to trading platform 130 and run one or more applications for interacting with a user. For example, computing devices 120A-120N can execute a browser application or a customized client to enable interaction between the computing devices 120A-120N and trading platform 130.

Trading platform 130 may include one or more servers capable of allowing traders to submit and manage orders (natural or synthetic) with an exchange or electronic marketplace 150. For example, trading platform may allow a trader to submit orders for stocks, options, future contracts, commodity contracts, etc. Trading platform 130 can be used to generate, manage, execute, distribute, and/or record trading and/or account data received from various sources (e.g., third-party data providers, financial institutions, etc.) through various interfaces. In some embodiments, trading platform 130 can include various data processing and analytic tools allowing users of the trading platform to make better trading decisions.

Trading platform 130 may be a third-party service accessed by various financial institutions or individuals. In some cases, a trading firm, individual or unaffiliated users, exchange members, and/or other groups may sign up for the service and submit and manage orders. In other embodiments, trading platform 130 may be a private or restricted platform that is owned and operated by an individual (or private) financial institution and only allows access to members of a trading firm or group. Trading platform 130 may be a fee for service or provide various membership levels offering different analysis features. Trading platform 130, in accordance with one or more embodiments, may allow a trading firm, an exchange, or other user of a marketplace to hand off their orders to other participants or trades, along with different pricing mechanisms (e.g., auction, percentage of total price, fixed fee, pricing tiers based on user groups, pricing based on type of financial instrument, and/or the like) for doing so.

Network 140 can include any combination of local area and/or wide area networks using both wired and wireless communication systems. In one embodiment, network 140 uses standard communications technologies and/or protocols. Thus, network 140 may include links using technologies such as Ethernet, 802.11, worldwide interoperability for microwave access (WiMAX), 3G, 4G, CDMA, digital subscriber line (DSL), etc. Similarly, the networking protocols used on network 140 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over network 140 may be represented using technologies and/or formats including hypertext markup language (HTML) or extensible markup language (XML). In addition, all or some links can be encrypted using conventional encryption technologies such as secure sockets layer (SSL), transport layer security (TLS), and Internet Protocol security (IPsec).

Inventory database 160 can store a variety of information that can be utilized by trading platform 130 and/or electronic marketplace 150 (e.g., stock market, bond market, capital market, foreign exchange market, futures market, etc.). For example, inventory database 160 may have stored thereon trading and/or account data and information about each user such as, but not limited to, age, contact information, e-mail address, membership level, activity logs, trading logs, and other information. In addition, order information such as, but is not limited to, time received, time executed, identification of a financial product, order identifier, order type, quantity, financial market, restrictions, owner, routing information, current status, and the like may also be stored in inventory database 160. According to some embodiments, the some of the data stored in inventory database 160 may include various data structures which can be used by trading platform 130, marketplace 150, and/or other computer or device. The following is an example of one such a data structure:

cessing. For example, in some embodiments, a small group of traders (or private institutions) could agree to interact on their discarded orders directly. Additionally, the traders could leave pre-set instructions on each other's trading systems to automatically hand over orders meeting certain requirements—for example, User A could automatically receive any order in the front month crude oil contract that is more than four ticks off the inside market, with any number of other rules, conditions or economic considerations imposed by the trader to set the automatic transfer. These could be opaque to the order placer, so that the order placer is indifferent when canceling an order and may not even know that the order was automatically assumed by someone in the order placer's peer network. In accordance with various embodiments, the order placer could approve the initial permission for the other user to configure automatic inheritance parameters. Other embodiments may include a hybrid configuration of the central order allocator and a peer-to-peer configuration.

A dynamic element to the order handling (hub, peer, or hybrid structure) may be present in some embodiments. For example, orders further off the market may be held open for claiming for a longer period than those closer to the inside market, and these periods could overall increase/decrease automatically based on market volatility specific to each contract market and/or other factors.

Figure 2:
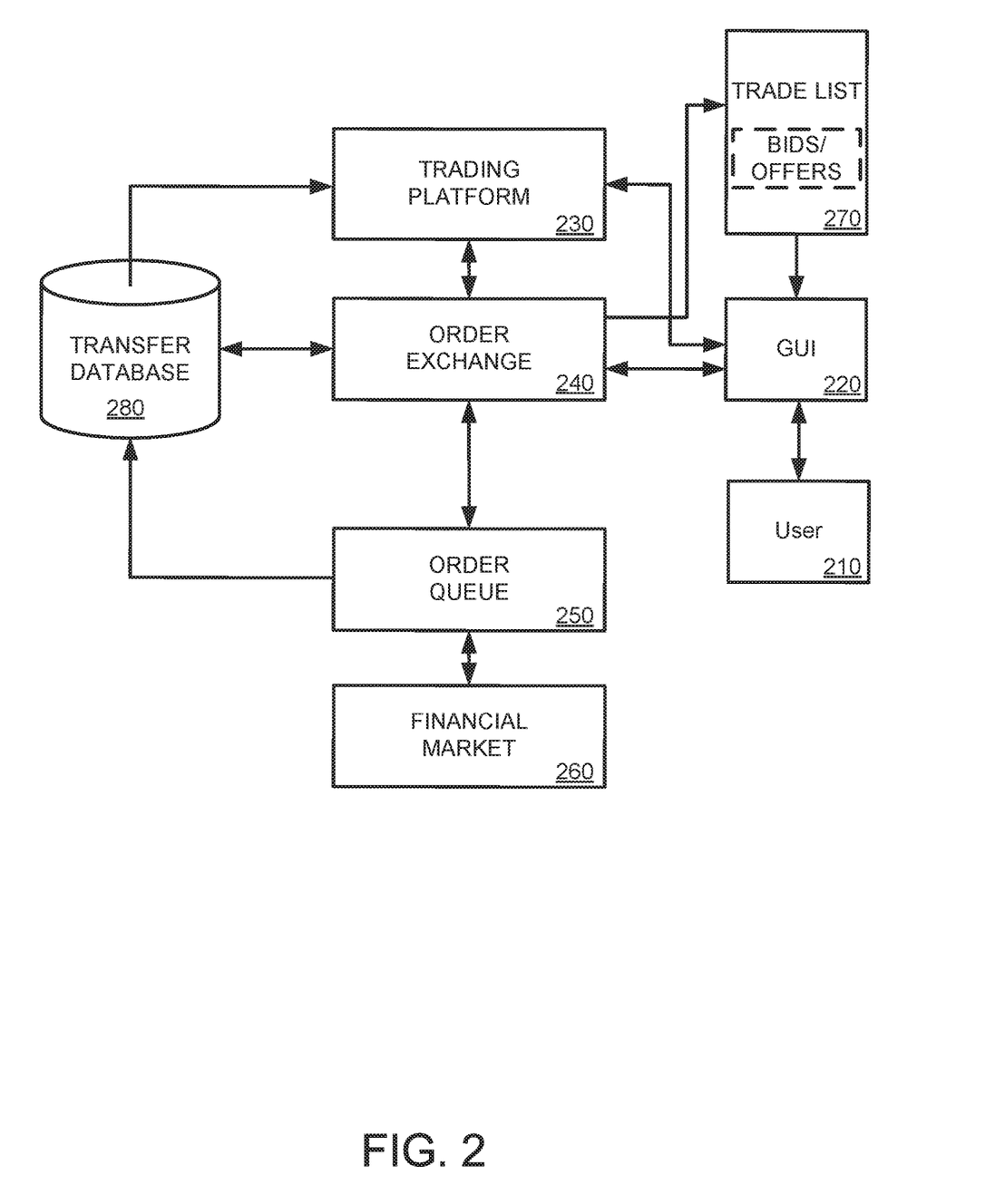
FIG. 2 illustrates various components and interactions in an order inheritance system according to one or more embodiments of the present invention.

FIG. 2 illustrates various components and interactions in an order inheritance system according to one or more embodiments of the present invention. As illustrated in FIG. 2, user 210 can use graphical user interface 220 to interact with trading platform 230 and order exchange 240. User 210 can submit an order through trading platform 230 which submits the order to the order queue 250 for execution on financial market 260. Once a trade has achieved a queue position, the trader may use GUI 220 to indicate that the order is available for inheritance or transfer using order exchange 240.

In some embodiments, the availability of the order may be created without any interaction from the current owner. For example, when a trader that originally placed the order cancels or modifies the order, the position change may be detected by order exchange 240 and automatically added to trade list 250 where other traders may take ownership. Various display indicators may be used to notify other users that the order and queue position are available in trade list 270. Once transferred to the new user, the order ownership information can be updated in transfer database 280 and in order queue 250. The type of underlying hardware hosting each of the components listed in FIG. 2, may be optimized or selected based on the inherent latencies of financial market 260.

Figure 3:
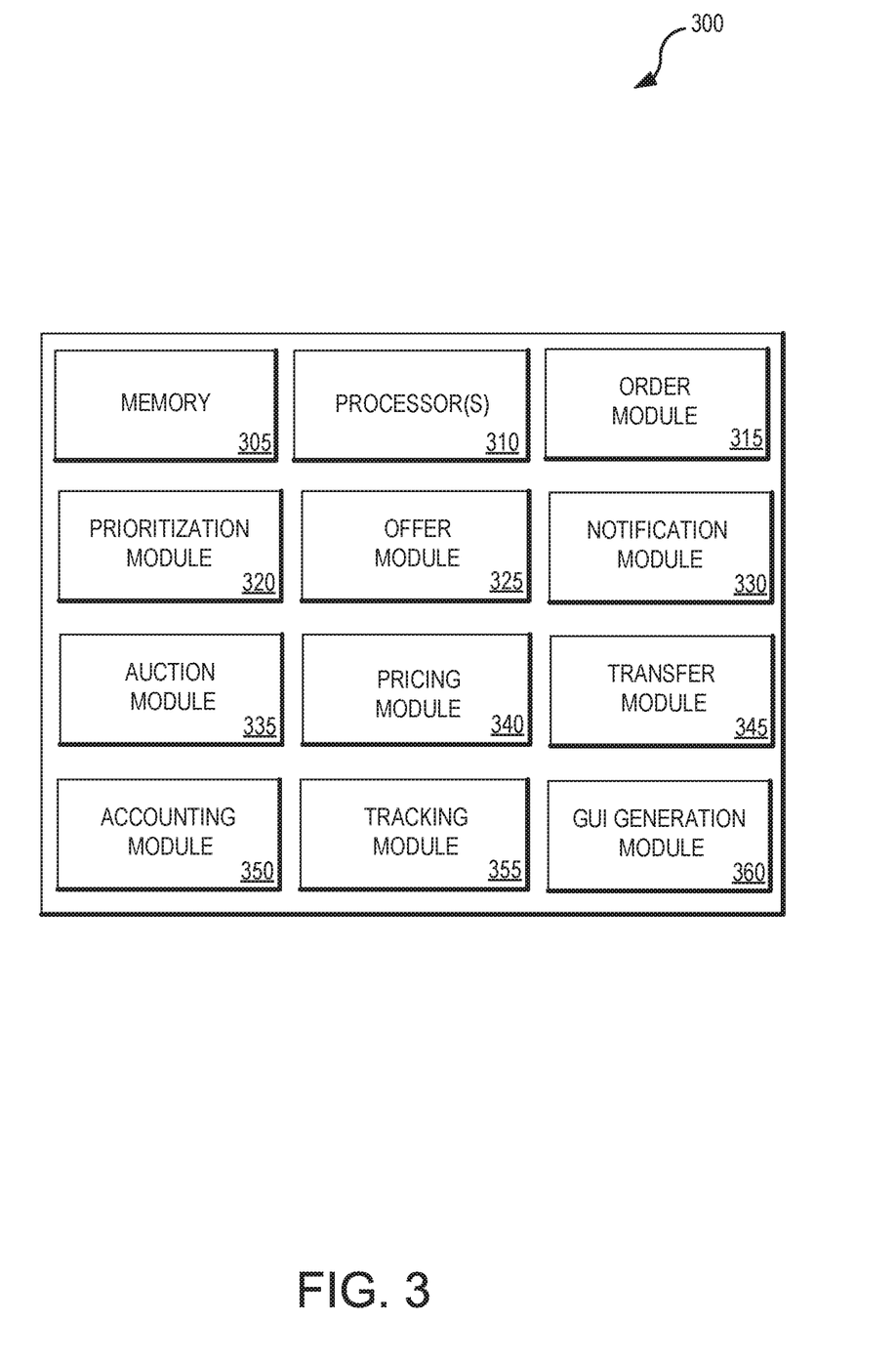
FIG. 3 illustrates various components of a trading platform which may be used in accordance with various embodiments of the present invention.

FIG. 3 illustrates various components of a trading platform 300 which may be used in accordance with various embodiments of the present invention. According to the embodiments shown in FIG. 3, trading platform 300 can include memory 305, one or more processors 310, order module 315, prioritization module 320, offer module 325,

| Order ID | Order Time | Trader ID | Firm ID | Bid/Ask Price | Quantity | Product |
| --- | --- | --- | --- | --- | --- | --- |

While FIG. 1 shows embodiments with a centralized hub collocated with the trading platform for posting, claiming, and processing the order transfers, other embodiments may be based on a peer-to-peer model where there would not be a central hub for the order posting, claiming, and/or processing.

notification module 330, auction module 335, pricing module 340, transfer module 345, accounting module 350, tracking module 355, and graphical user interface (GUI) generation module 360. Other embodiments of the present invention may include some, all, or none of these modules and components along with other modules, applications, and/or components. Still yet, some embodiments may incorporate two or more of these modules and components into a single module and/or associate a portion of the functionality of one or more of these modules with a different module. For example, in one embodiment, transfer module 345 and accounting module 350 can be combined into a single module for coordinating and processing payments for order transfers.

Memory 305 can be any device, mechanism, or populated data structure used for storing information. In accordance with some embodiments of the present invention, memory 305 can encompass any type of, but is not limited to, volatile memory, nonvolatile memory and dynamic memory. For example, memory 305 can be any memory noted herein. In accordance with some embodiments, memory 305 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 305.

Memory 305 may be used to store instructions for running one or more applications or modules on application processor(s) 310. For example, memory 305 could be used in one or more embodiments to house all or some of the instructions needed to execute the functionality of order module 315, prioritization module 320, offer module 325, notification module 330, auction module 335, pricing module 340, transfer module 345, accounting module 350, tracking module 355, and/or GUI generation module 360. The components may be collocated within or distributed across trading platform 130 or electronic marketplace/financial market 150.

Order module 315 can be configured to receive orders from various trading interfaces (e.g., trading GUIs, algorithmic trading systems, etc.). The orders may be to buy or sell a position, along with all data associated with that position. In other cases, the order may be to transfer the position to a new owner. Still yet, in other cases, the order may be to offer the position for transfer, including, e.g. a price or other consideration to be offered for that position. The order received may include a variety of order information needed by the systems and system components to execute the order. The order information may include, but is not limited to, time received, time executed, identification of a financial product, tag 50 id, order identifier, order type, quantity, financial market, restrictions, owner, routing information, current status, and other information. For example, many exchanges use a tag 50 id to identify the individual operator associated with a particular trade in an order book. As a result, the order may be directly changed within the order book of an exchange. In other embodiments, order module 315 may track the ownership without notifying the exchange of the change.

Order module 315 can add or remove orders to or from the order queue. Once an order is added to the order queue, processed, or updated (e.g., canceled or transferred) additional order information may be associated with the order and the order information (e.g., metadata fields, logs, etc.) may be updated. For example, when an order is transferred from one owner to another, the owner information may be updated (e.g., by updating a tag 50 id and/or other identification information locally or at an exchange) and logs of all transactions maintained for possible later audit or analysis. In some embodiments, the owner information may identify all prior owners in addition to the current owner. Similarly, the current status may be updated to indicate the position has been transferred. A queue position can be updated based on information from the order queue. Other information may be recorded such as the time of the transfer, price of the transfer, transfer terms (e.g., indicating profit sharing), and others.

Prioritization module 320 can be used to determine how to prioritize multiple offers on a transfer that are received through offer module 325. For example, offers may be prioritized based on a variety of factors, such as, first to click on the order or first to respond (time), priority given to those with a risk needed to be hedged, highest payer, trader seniority, affiliations, account balances, number of trades within a predetermined time period, order type, and/or other factors. Indeed, depending upon various factors such as the business goals of a firm, the prioritization module may implement complex rules to appropriately handle multiple offers.

Notification module 330 can be used to generate notifications/indications to other traders. In some embodiments, the notifications may be published in tiers to various traders. For example, the orders may be published first to traders associated within a trading group within a financial institution, then to every trader associated with the financial institution, then to other traders using the trading platform outside of the financial institution, and then broadcast to all traders through the exchange. In some embodiments, time periods (static or dynamic) may be associated with each level of publication before publication to the next level occurs. For example, each level may have a static five minute time period. In this example, the orders could be initially published first to traders associated within a trading group within a financial institution, then five minutes later to every trader associated with the financial institution, then five minutes later to other traders using the trading platform outside of the financial institution, and then broadcast to all traders through the exchange. Dynamic time periods may be adjusted based on a variety of factors including indicia of urgency indicated by the original owner, indications of interest, time till market close, movement in the market, and other factors that could impact the order.

Auction module 335 can be used to manage an auction for the order transfers. Pricing module 340 can determine a price for the transfer. In accordance with various embodiments, the price may depend on a variety of factors such as order position, order pricing, trader seniority, trader volume, position pricing, trader positions within the queue, affiliations, membership level, interest in the transfer, interest in the underlying financial product, similar orders, exchange rates, and/or other factors. For example, a trader with a higher volume of traders may receive a lower price than a trader with a lower trade volume. As another example, a trader may pay for a transfer membership level that provides a discounted price or provides a fixed pricing structure.

Transfer module 345 manages the transfer of ownership from the first owner to the second owner. Transfer module 345 can communicate with accounting module 350 to ensure that all fees relating to the transfer are collected. In some embodiments, the transfer pricing may include a fixed portion and/or a variable portion. The variable portion may be related (e.g., a percentage) to a total transaction cost or the profit made by the second owner. Accounting module 350 tracks the transaction costs and/or profit made by the second owner and ensures that the fixed portion and/or the variable portion of the pricing structure is property accounted.

Tracking module 355 can be used to create log files that track who an order came from, who the order was transferred to, ultimate resolution of the order (e.g., filled, not filled, cancelled, subsequent transfer, etc.). These logs may be used by accounting module 350 to compute the pricing. In addition, these logs may be used by various reporting, tracking, auditing, and/or compliance systems. Tracking module 355 may also monitor order placement and cancellation profiles in an attempt to identify traders that are placing orders without the intent of having them filled. Such a feature may be needed to ensure compliance with various governmental and/or exchange regulations.

For example, detection algorithms applied to the order cancellation and inheritance activity that could determine cancellation rates/percentages, cancellation trends, resting time for orders, etc., so that flags, alerts, or reports could be generated to provide an analysis of a trader's and a firm's order activity. If a trader is canceling orders at a rate greater than those tolerated by exchanges or regulators, or "flashing" orders without the intent to have them filled, then such analytics could alert a firm's compliance personnel so that they could work to mitigate any suspicious activity. The alert, for example, may be sent to compliance software running on a computing device associated with the compliance personnel. The compliance software can be configured to directly access the database and retrieve (automatically or upon request) data stored in database, format the data for analysis by the compliance personnel, and/or provide a recommendation with supporting documentation that the compliance officer can edit. The compliance software, in various embodiments, may present one or more solutions or recommendations, interact with the trading platform to suspend trading or order inheritance privileges, set limits to cancellation frequencies, as well as other features. In some embodiments, tracking module 355 may be monitoring activity (e.g., in real or near real-time) and generate signals that cause the trading platform or marketplace to restrict privileges such as trading or inheritance options.

GUI generation module 360 can generate one or more GUI screens that allow for interaction with a user of the mobile device. In at least one embodiment, GUI generation module 360 generates a graphical user interface allowing a user of the mobile device to set preferences, present reports, and/or otherwise receive or convey information to the user.

Figure 4:
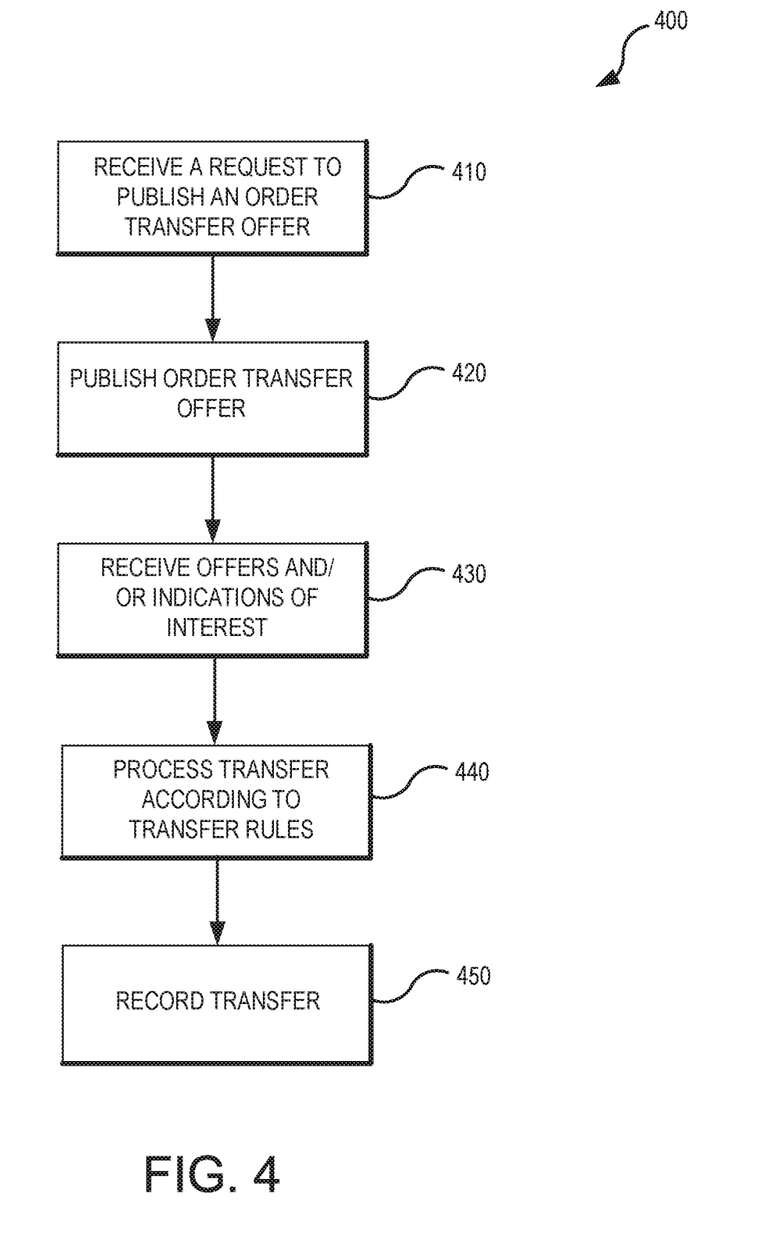
FIG. 4 is a flowchart illustrating a set of operations for processing order transfers in accordance with one or more embodiments of the present invention.

FIG. 4 is a flowchart illustrating a set of operations 400 for processing order transfers in accordance with one or more embodiments of the present invention. The operations illustrated in FIG. 4 can be performed by various systems and components such as trading platform 130, electronic marketplace 150, processor(s) 310, order module 315, notification module 330, pricing module 340, transfer module 345, tracking module 355, and/or other devices, systems, components, and/or modules. As illustrated in FIG. 4, receiving operation 410 receives a request to publish an order transfer offer so as to transfer an order with a position in an order queue from a first trader to a second trader.

Once received, the order transfer can then be published to one or more other traders in publishing operation 420. In accordance with some embodiments, the trader can select (e.g., through a trading application or graphical user interface) individual traders, groups of traders, and/or all traders to which the order can be published. In other embodiments, a trading platform (or exchange) can select which traders (e.g., groups of traders) will be offered the chance to request the order be transferred to them. For example, the trading platform (or exchange) may use various selection criteria such as, but not limited to, order position, order pricing, trader seniority, trader availability, trader volume, position pricing, trader positions within the queue, affiliations, memberships, and/or other criteria. The selection criteria may be set by the trader, trade group, trading platform, and/or the exchange.

The selected traders may be prioritized in some embodiments and given an amount of time to respond before opening up the offer to additional traders with lower priority levels. In some embodiments, there may be a tiered publishing system where the orders are published to traders within specific tiers before the orders are published to traders in the next lower tier. The price, cost, or fee for transferring the order may be adjusted, in some embodiments, for each tier.

Upon reviewing the published orders, the traders can make a request or offer on the orders. These requests or offers are then received during receiving operation 430. The offers are processed and a second trader is selected as the new owner of the order during transfer operation 440. In some embodiments, there may be a minimum wait time to receive offers while in other embodiments the orders may be processed on a first come first served basis. An auction may be held (e.g., using auction module 335) for the order. The ownership of the order is then recorded during recordation operation 450.

Figure 5:
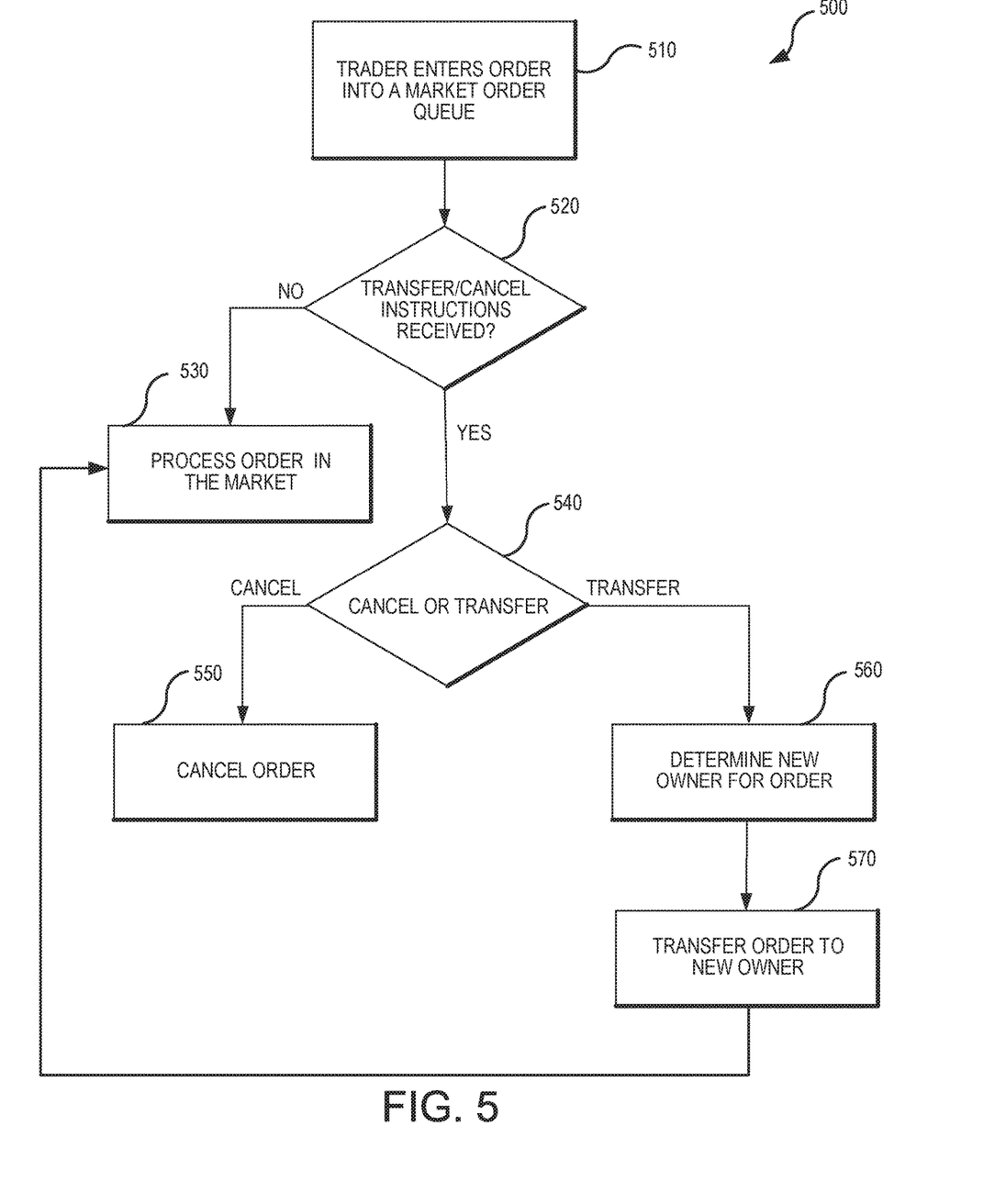
FIG. 5 is a flowchart illustrating a set of operations for processing orders in accordance with various embodiments of the present invention.

FIG. 5 is a flowchart illustrating a set of operations 500 for processing orders in accordance with various embodiments of the present invention. The operations illustrated in FIG. 5 can be performed by various systems and components such as user interface 110A-110N, computing devices 120A-120N, trading platform 130, electronic marketplace 150, processor(s) 310, order module 315, notification module 330, transfer module 345, tracking module 355, and/or other devices, systems, components, and/or modules. As illustrated in FIG. 5, submission operation 510 allows a trader to submit an order into a market queue. The order is added to the market queue at a particular position and waits to be executed. In some embodiments, submission operation 510 may be automatically performed by a trading system running automated trading algorithms. The automated trading algorithms may also be able to automatically transfer or cancel the order based on detection of various market conditions or trends.

Determination operation 520 determines if instructions have been received to transfer or cancel the order. If determination operation 520 determines that no instructions have been received, determination operation 520 branches to processing operation 530 where the order is processed in the market. If determination operation 520 determines that instructions have been received to transfer or cancel the order, then determination operation 520 branches to instruction operation 540. If instruction operation 540 determines that a request to cancel the order has been submitted, then instruction operation 540 branches to cancel operation 550 where the order is canceled and removed from the order queue. If instruction operation 540 determines that a request to transfer the order has been submitted, then instruction operation 540 branches to ownership operation 560 where a new owner is determined for the order. Once a new owner has been determined transfer operation 570 transfers the order to the new owner and the order is processed in the market during processing operation 530.

For example, if the inside market of a futures contract traded on an electronic exchange is 98.30 bid, 98.40 offered (0.10 per tick), Trader A may submit a buy order for 100 contracts @ 97.00 to exchange (13 ticks away from inside market). The exchange receives the order and places the order in order queue at 97.00. Further, assume that at the time of order placement, the order is 4th in queue (FIFO method), with the following orders at 97.00 having priority: 25 lot, 25 lot, and 50 lot. After submission of trader A's order, the current state of queue is [25][25][50][100]. As time passes, the 1st 25 lot cancels, as does the 50 lot, and a 30 lot order, a 200 lot order, and a 125 lot order are submitted. As a result, the current state of queue is [25][100 (Trader A's order)][30][200][125].

The inside market descends to 97.20 bid, 97.30 offered. Trader A's order has an increased probability of being filled if the market continues to fall. Trader A becomes busy trading other markets and does not want to focus on this order, and has the option of either cancelling the order which would be deleted from the exchange upon the exchange receiving the cancel message. However, no other trader in the firm could take advantage of trader A's excellent queue position if deleted. Depending on the market, it can be very difficult to get filled due to low volume, low volatility etc. Only a certain number of contracts may trade at each price, so having a queue position that maximizes a trader's ability to get fills is important. As a result, Trader A may elect to notify other traders within the firm (e.g., using IM, popup screen, flashing light at 97.00 on their GUI, etc.) that an order is temporarily available. Traders can then elect to assume that order. As a result, a newly assigned trader assumes the control or ownership of the order. Control or ownership of the order does not mean that the order will be filled or that any other action with respect to the order will be taken. Allocation of the order among multiple traders competing for it could be accomplished by first to respond, seniority, willingness to pay a premium, pro rata, etc.

Various embodiments allow for this order at its existing queue position to become available to other traders within the firm (or outside the firm), providing the other traders with much better queue position (and therefore probability of getting filled) than if they entered a new order at the back of the queue. Assume that the order is allocated to Trader B; Trader B now controls the order and any fills on that order will be sent to Trader B. Trader B now has the option of cancelling the order, waiting for the order to fill, and/or offering the order to other traders.

In some embodiments, the transfer may be controlled at the exchange, instead of residing within a trading firm. In these embodiments, the exchange could utilize the various mechanisms listed above to transfer orders to other market participants. The exchange market structure is best positioned to charge a per-contract fee for assuming an order with optimal queue position. One advantage of the transfer mechanism residing with the exchange is that an exchange-implemented model of this system would decrease the need for some market participants to invest in costly co-location services and other latency-minimizing software and hardware solutions, since the opportunity to assume an existing order mitigates the need to be quickest to a given price.

Some embodiments of the trading platform allow firms to assume various market positions and create an auto hedging position. For example, a house repository may utilize automatic trading algorithms to accept some or all of the available orders and prepare an automatic hedge. If such an order held by the house (before it is claimed by or allocated to a trader or account) is executed and filled, then some embodiments of the system could automatically place a hedging order, based on the firm's analytics or hedging protocols, in order to mitigate that position's risk until the position is unwound or allocated to another trader. An example would be if the house held an order to buy 10-year Treasury futures that was executed, the trading system could automatically execute a sale of the appropriate amount of 10-year Treasury cash bonds (or any number of securities or futures that the firm feels sufficiently hedges their new position) to hedge the futures position.

The techniques disclosed herein may provide a variety of additional technical benefits such as, but not limited to, increasing liquidity within the market. Since traders using embodiments of the present technology can derive an economic benefit from resting orders within the market, the traders are more likely to have actionable orders within an order book. Such availability of orders results in more efficient markets thereby allowing all traders to benefit from the increased liquidity and more efficient pricing. Moreover, electronic trading is executed using complex networks of computing equipment and software. The speed at which the trades are made, positions in the queue allocated and broker accounts reconciled cannot be done by hand, and the coordination required to handle multiple traders across many offices make it impossible for this to be done manually. As a result, the techniques of the various embodiments are significantly more than an abstract ideas as they do not simply implement traditional computer functions, but address specific challenges present in trading technology and are rooted in specific improvements to trading technology.

Figure 6:
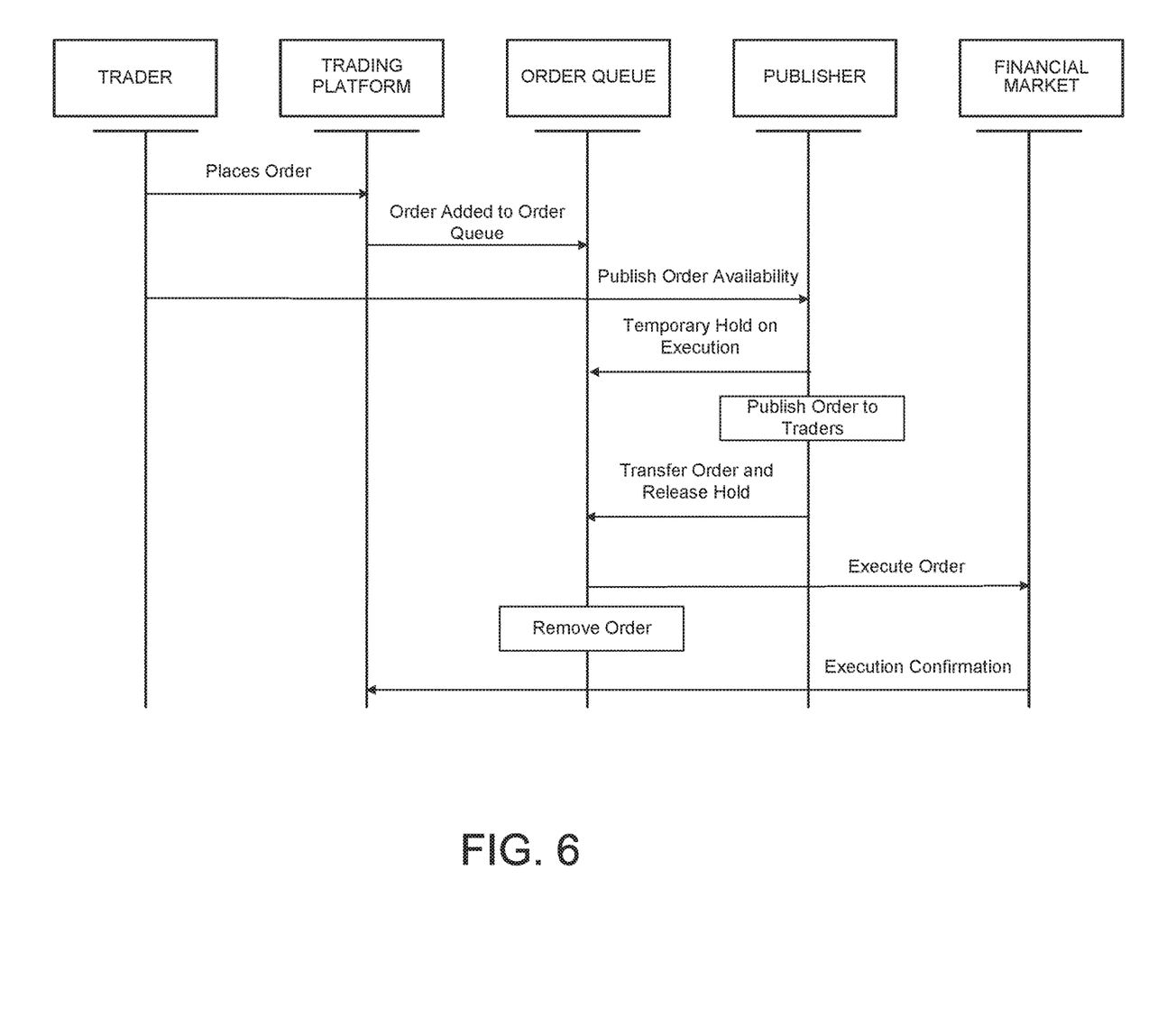
FIG. 6 is a sequence diagram illustrating various communications between components of a system supporting order inheritance functionality in accordance with some embodiments of the present invention.

FIG. 6 is a sequence diagram illustrating various communications between components of a system supporting order inheritance functionality in accordance with some embodiments of the present invention. As illustrated in FIG. 6, a trader places an order using a trading platform. The order is added to the order queue. At some point in time after the order is place, but while the order is still pending in the order queue, the trader publishes that the order is available for transfer. A temporary hold can be placed on the order in the order queue during a transfer period (e.g., less than one minute). A publisher publishes the order availability to other traders. Other traders can request a transfer and a transfer order can be sent to the order queue transferring the order from the original owner to a second owner and releasing the hold. If the order is processed through the electronic market, then the order is removed and an execution confirmation is transmitted from the electronic market to the trading platform.

Exemplary Computer System Overview

Aspects and implementations of the order inheritance and transfer system of the disclosure have been described in the general context of various steps and operations. A variety of these steps and operations may be performed by hardware components or may be embodied in computer-executable instructions, which may be used to cause a general-purpose or special-purpose processor (e.g., in a computer, server, or other computing device) programmed with the instructions to perform the steps or operations. For example, the steps or operations may be performed by a combination of hardware, software, and/or firmware.

Figure 7:
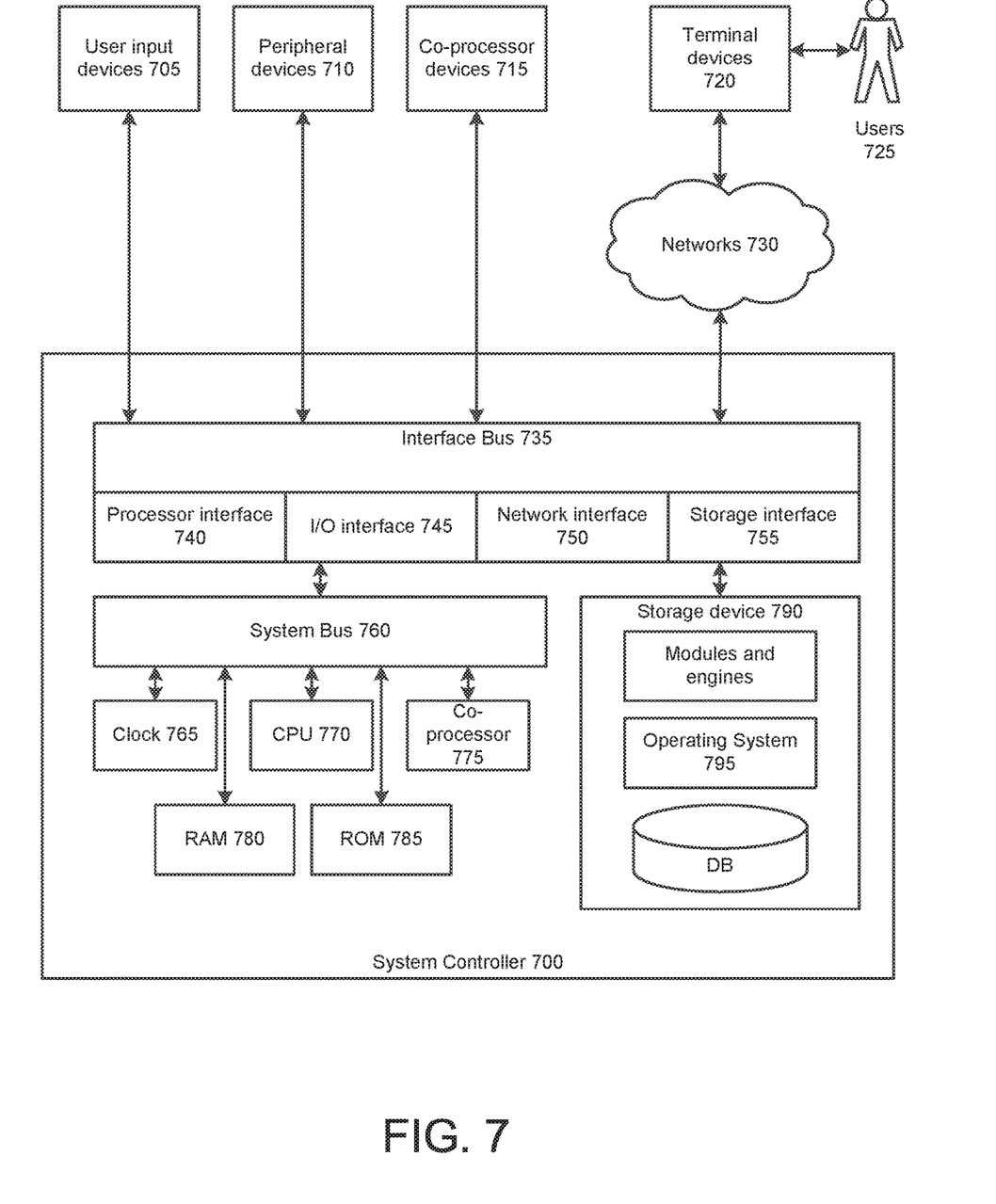
FIG. 7 illustrates an example of a computer system with which some embodiments of the present invention may be utilized.

FIG. 7 is a block diagram illustrating an example machine representing the computer systemization of the order inheritance and transfer system. The order inheritance and transfer system controller 700 may be in communication with entities including one or more users 725 (e.g., human and non-human users/traders), client/terminal devices 720 (e.g., devices 120A-120N), user input devices 705, peripheral devices 710, an optional co-processor device(s) (e.g., cryptographic processor devices) 715, and networks 730 (e.g., network 140). Users may engage with the controller 700 via terminal devices 720 over networks 730.

Computers may employ central processing unit(s) (CPU) or processor(s) (hereinafter "processor") to process information. Processors may include programmable general-purpose or special-purpose microprocessors, programmable controllers, application-specific integrated circuits (ASICs), programmable logic devices (PLDs), embedded components, combination of such devices and the like. Processors execute program components in response to user and/or system-generated requests. One or more of these components may be implemented in software, hardware or both hardware and software. Processors pass instructions (e.g., operational and data instructions) to enable various operations.

The order inheritance and transfer controller 700 may include clock 765, CPU 770, memory such as read only memory (ROM) 785 and random access memory (RAM) 780 and co-processor 775 among others. These controller components may be connected to a system bus 760, and through the system bus 760 to an interface bus 735. Further, user input devices 705, peripheral devices 710, co-processor devices 715, and the like, may be connected through the interface bus 735 to the system bus 760. The interface bus 735 may be connected to a number of interface adapters such as processor interface 740, input output interfaces (I/O) 745, network interfaces 750, storage interfaces 755, and the like.

Processor interface 740 may facilitate communication between co-processor devices 715 and co-processor 775. In one implementation, processor interface 740 may expedite encryption and decryption of requests or data. Input output interfaces (I/O) 745 facilitate communication between user input devices 705, peripheral devices 710, co-processor devices 715, and/or the like and components of the controller 700 using protocols such as those for handling audio, data, video interface, wireless transceivers, or the like (e.g., Bluetooth, IEEE 1394a-b, serial, universal serial bus (USB), Digital Visual Interface (DVI), 702.11a/b/g/n/x, cellular, etc.). Network interfaces 750 may be in communication with the network 730. Through the network 730, the controller 700 may be accessible to remote terminal devices 720 (e.g., client devices 180). Network interfaces 750 may use various wired and wireless connection protocols such as, direct connect, Ethernet, wireless connection such as IEEE 702.11a-x, and the like.

Examples of network 730 include the Internet, Local Area Network (LAN), Metropolitan Area Network (MAN), a Wide Area Network (WAN), wireless network (e.g., using Wireless Application Protocol WAP), a secured custom connection, and the like. The network interfaces 750 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including, for example, the access and operation rights of an object by an individual, a machine, and/or an application, and the circumstances under which the permission rights stand. Other network security functions performed or included in the functions of the firewall, can be, for example, but are not limited to, intrusion prevention, intrusion detection, next-generation firewall, personal firewall, etc., without deviating from the novel art of this disclosure.

Storage interfaces 755 may be in communication with a number of storage devices such as storage devices 790, removable disc devices, and the like. The storage interfaces 755 may use various connection protocols such as Serial Advanced Technology Attachment (SATA), IEEE 1394, Ethernet, Universal Serial Bus (USB), and the like.

User input devices 705 and peripheral devices 710 may be connected to I/O interface 745 and potentially other interfaces, buses and/or components. User input devices 705 may include card readers, finger print readers, joysticks, keyboards, microphones, mouse, remote controls, retina readers, touch screens, sensors, and/or the like. Peripheral devices 710 may include antenna, audio devices (e.g., microphone, speakers, etc.), cameras, external processors, communication devices, radio frequency identifiers (RFIDs), scanners, printers, storage devices, transceivers, and/or the like. Co-processor devices 715 may be connected to the controller 700 through interface bus 735, and may include microcontrollers, processors, interfaces or other devices.

Computer executable instructions and data may be stored in memory (e.g., registers, cache memory, random access memory, flash, etc.) which is accessible by processors. These stored instruction codes (e.g., programs) may engage the processor components, motherboard and/or other system components to perform desired operations. The controller 700 may employ various forms of memory including on-chip CPU memory (e.g., registers), RAM 780, ROM 785, and storage devices 790. Storage devices 790 may employ any number of tangible, non-transitory storage devices or systems such as fixed or removable magnetic disk drive, an optical drive, solid state memory devices and other processor-readable storage media. Computer-executable instructions stored in the memory may include one or more program modules such as routines, programs, objects, components, data structures, and so on that perform particular tasks or implement particular abstract data types. For example, the memory may contain operating system (OS) component 795, modules and other components, database tables, and the like. These modules/components may be stored and accessed from the storage devices, including from external storage devices accessible through an interface bus.

The database components can store programs executed by the processor to process the stored data. The database components may be implemented in the form of a database that is relational, scalable and secure. Examples of such database include DB2, MySQL, Oracle, Sybase, and the like. Alternatively, the database may be implemented using various standard data-structures, such as an array, hash, list, struct, structured text file (e.g., XML), table, and/or the like. Such data-structures may be stored in memory and/or in structured files.

The order inheritance and transfer system controller 700 may be implemented in distributed computing environments, where tasks or modules are performed by remote processing devices, which are linked through a communications network, such as a Local Area Network ("LAN"), Wide Area Network ("WAN"), the Internet, and the like. In a distributed computing environment, program modules or subroutines may be located in both local and remote memory storage devices. Distributed computing may be employed to load balance and/or aggregate resources for processing. Alternatively, aspects of the controller 700 may be distributed electronically over the Internet or over other networks (including wireless networks). Those skilled in the relevant art will recognize that portions of the order inheritance and transfer system may reside on a server computer, while corresponding portions reside on a client computer. Data structures and transmission of data particular to aspects of the order inheritance and transfer controller 700 are also encompassed within the scope of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Furthermore, any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A computer-implemented method comprising:
receiving, at a first point in time and through a trading platform, an electronic order from a computing device of a first trader of multiple traders,
wherein the electronic order includes (a) a bid or ask price, and (b) a quantity;
in response to receiving the electronic order, establishing, using the trading platform, a position for the electronic order in an order queue associated with a financial market,
wherein the established position is based on (a) the bid or ask price and (b) the first point in time, and
wherein the order queue associated with the financial market indicates the established position relative to other established positions of other electronic orders;
storing the established position for the electronic order as an entry in a database associated with the financial market,
wherein the entry has a data structure having fields that include an order identifier field, a trader identifier field including a trader identifier associated with the first trader, an established position field, a bid or ask price field, and a quantity field;
receiving, at a second point in time after the first point in time, an indication of an intent to abandon control of the electronic order in the established position of the order queue;
in response to the intent to abandon control of the electronic order, associating an electronic tag with the electronic order to indicate the intent to abandon the electronic order in the established position of the order queue,
wherein the electronic tag is associated with a time period during which another trader can assume control of the electronic order in the established position of the order queue;
broadcasting, through the trading platform to the multiple traders, parallel notifications of the intent to abandon control of the electronic order in the established position of the order queue;
receiving, within the time period, requests from multiple bidding traders to inherit control of the electronic order in the established position of the order queue;

selecting a request of a second trader from among the multiple bidding traders through an auction process to transfer control of the electronic order from the first trader to the second trader;

in response to selecting the request to transfer control of the electronic order:

notifying, through the trading platform, the second trader of acceptance of the request to transfer control of the electronic order;

analyzing trading activities for the first trader stored in the database;

generating cancellation rates, cancellation trends, or resting time for electronic orders associated with the first trader;

identifying when the cancellation rates, cancellation trends, or resting time for electronic orders associated with the first trader exceed tolerances set by the financial market or regulators;

automatically suspending trading privileges when the cancellation rates, cancellation trends, or resting time for electronic orders associated with the first trader exceeds tolerances set by the financial market or the regulators; and transmitting an alert to compliance software running on a computing device of an identified compliance personnel that cancellation rates, cancellation trends, or resting time for electronic orders associated with the first trader exceeds tolerances set by the financial market or the regulators; and updating the entry stored in the database to replace the trader identifier in the trader identifier field with another trader identifier associated with the second trader such that the second trader inherits control of the electronic order in the established position of the order queue while preserving the established position of the electronic order in the order queue, wherein transferring control of the electronic order takes place at a centralized exchange thereby decreasing a need for latency-minimizing software and hardware.

2. The computer-implemented method of claim 1, wherein selection of the request of the second trader through the auction process is based on an order position, order price, trader seniority, trader volume, position pricing, trader position, affiliation, membership level, interest in the transfer, interest in an underlying financial product, similar order, or exchange rate associated with the multiple bidding traders.

3. The computer-implemented method of claim 1, wherein notifying the second trader includes generating a visual indicator on a trading application viewed by the second trader.

4. The computer-implemented method of claim 1, further comprising:

receiving a second request to transfer control of the electronic order owned by the second trader to a third trader; and transferring control of the electronic order from the second trader to the third trader.

5. The computer-implemented method of claim 1, further comprising:

publishing electronic orders on the order queue to the multiple traders; and communicating indications of interest in the electronic orders to owners of the electronic orders.

6. The computer-implemented method of claim 1, further comprising:

determining a price for the transfer of control of the electronic order from the first trader to the second trader, wherein the price is based on the established position in the order queue.

7. The computer-implemented method of claim 1, further comprising:

determining a price structure for the transfer of control of the electronic order, wherein the price structure includes a fixed portion and a variable portion.

8. The computer-implemented method of claim 1, further comprising:

tracking an evolution of the electronic order after control has been transferred.

9. The computer-implemented method of claim 1, further comprising:

determining a price of the transfer of control of the electronic order from the first trader to the second trader in response to receiving a request to transfer control of the electronic order, wherein the price of the transfer includes a fixed portion and a variable portion.

10. The computer-implemented method of claim 9, further comprising:

tracking transaction costs and profits made by the second trader associated with the electronic order.

11. The computer-implemented method of claim 1, further comprising:

identifying the second trader as a trader who is first to respond to the request to transfer of control of the electronic order from the first trader;

identifying the second trader as a trader with a risk needed to be hedged;

identifying the second trader based on seniority of the second trader; and/or identifying the second trader based on a trade volume of the second trader.

12. The computer-implemented method of claim 1, further comprising:

placing a temporary hold on the electronic order in the order queue in response to receiving the request to transfer control of the electronic order.

13. At least one computer-readable medium, excluding transitory medium, and carrying instructions, which when executed by at least one data processor, perform a method comprising:

receiving, from a first computing device of a first trader, an indication of an intent to abandon control of a pending electronic order to other traders, wherein the first computing device is communicatively coupled via a private network to computing devices associated with the other traders within a private financial institution;

wherein the pending electronic order has an established position in an electronic order queue based on (a) a bid or ask price of the pending electronic order, and (b) a first point in time at which the pending electronic order was placed, wherein the established position is stored in an entry of a database associated with an electronic financial market, and wherein the entry includes an identifier of the pending electronic order, a first trader identifier associated with the first trader, the established position, and the bid or ask price of the pending electronic order;

in response to the indication of the intent to abandon control of the pending electronic order, associating an electronic tag with the pending electronic order to place a temporary hold on the control of the pending electronic order;

broadcasting parallel notifications to the other traders to indicate the intent to abandon control of the pending electronic order, wherein the first computing device is communicatively coupled to a trading platform, and wherein the trading platform is configured to select a second trader among the other traders through an auction process to transfer control of the pending electronic order from the first trader to the second trader via the private network;

updating the entry stored in the database to replace the first trader identifier with a second trader identifier associated with the second trader such that the second trader inherits control of the pending electronic order;

sending, to the first computing device, a notification of acceptance indicating that the transfer of control of the pending electronic order has been completed, wherein the transfer of control of the pending electronic order takes place at a centralized exchange thereby decreasing a need for latency-minimizing software and hardware.

14. The at least one computer-readable medium of claim 13, wherein the indication of the intent to abandon control of the pending electronic order is first published to traders associated within a trading group within the private financial institution and then to every trader associated with the private financial institution.

15. The at least one computer-readable medium of claim 13, further comprising:

computing a price to transfer control of the pending electronic order based on the established position in the electronic order queue, seniority of the second trader, or trade volume of the second trader.

16. The at least one computer-readable medium of claim 13, further comprising:

determining a price structure for transfer of control of the pending electronic order, wherein the price structure includes a fixed portion and a variable portion;

accounting for the fixed portion and the variable portion of the price.

17. The at least one computer-readable medium of claim 13, further comprising automatically placing a hedge order based on customized analytics or hedging protocols to mitigate position risk associated with the financial institution.

18. The computer-implemented method of claim 1, further comprising:

notifying the financial market to update the order queue to reflect the transfer of control of the electronic order from the first trader to the second trader.

19. The computer-implemented method of claim 1, wherein notifying the second trader of the transfer of control of the electronic order includes notifying the multiple traders of the request to transfer control of the electronic order.

20. The computer-implemented method of claim 19, wherein notifying the multiple traders of the request to transfer control of the electronic order includes notifying traders in tiers, and wherein the tiers include any combination of two or more of the following:

traders associated with a trading group of a financial institution of the first trader, every trader associated with the financial institution of the first trader, other traders using the trading platform, and/or all traders of the financial market.

21. The computer-implemented method of claim 20, wherein notifying traders in tiers includes notifying traders of a first tier and notifying traders of a second tier a period of time after notifying the traders of the first tier.

22. A computer-implemented method comprising:

receiving, from a first computing device of a first trader, an indication of an intent to abandon control of a pending electronic order to other traders, wherein the pending electronic order has an established position in an electronic order queue based on (a) a bid or ask price of the pending electronic order, and (b) a first point in time at which the pending electronic order is placed, wherein the established position is stored in an entry of a database associated with an electronic financial market, and wherein the entry includes an identifier of the pending electronic order, a first trader identifier associated with the first trader, the established position, and the bid or ask price of the pending electronic order;

in response to the indication of the intent to abandon control of the pending electronic order, associating an electronic tag with the pending electronic order to place a temporary hold on control of the pending electronic order;

broadcasting parallel notifications to the other traders to indicate the intent to abandon control of the pending electronic order, wherein the first computing device is communicatively coupled to a trading platform, wherein the trading platform is configured to select second trader among the other traders through an auction process to transfer control of the pending electronic order from the first trader to the second trader via the private network;

updating the entry stored in the database to replace the first trader identifier with a second trader identifier associated with the second trader such that the second trader inherits control of the pending electronic order;

sending, to the first computing device, a notification of acceptance indicating that the transfer of control of the pending electronic order has been completed, wherein the transfer of control of the pending electronic order takes place at a centralized exchange thereby decreasing a need for latency-minimizing software and hardware.

\* \* \* \* \*